(12) United States Patent
Tsuchida et al.

(10) Patent No.: US 8,137,835 B2
(45) Date of Patent: Mar. 20, 2012

(54) PLATED STEEL PLATE FOR CELL CAN, BATTERY, ALKALINE DRY BATTERY

(75) Inventors: Yuji Tsuchida, Shizuoka (JP); Shigeyuki Kuniya, Shizuoka (JP); Tatsuya Yamazaki, Shizuoka (JP)

(73) Assignee: FDK Energy Co., Ltd., Shizuoka (JP)

( * ) Notice: Subject to any disclaimer, the term of this patent is extended or adjusted under 35 U.S.C. 154(b) by 613 days.

(21) Appl. No.: 12/303,002

(22) PCT Filed: May 30, 2007

(86) PCT No.: PCT/JP2007/060960
§ 371 (c)(1),
(2), (4) Date: Jan. 19, 2009

(87) PCT Pub. No.: WO2007/139133
PCT Pub. Date: Dec. 6, 2007

(65) Prior Publication Data
US 2009/0197164 A1    Aug. 6, 2009

(30) Foreign Application Priority Data

May 31, 2006    (JP) .................. 2006-151443

(51) Int. Cl.
*H01M 2/00*    (2006.01)

(52) U.S. Cl. ......... 429/163; 429/166; 429/164; 429/176

(58) Field of Classification Search .................. 429/166, 429/167, 168, 163, 164, 174, 206, 122, 176; 428/615, 686, 687
See application file for complete search history.

(56) References Cited

FOREIGN PATENT DOCUMENTS

| | | |
|---|---|---|
| JP | 9-306441 | 11/1997 |
| JP | 9-306441 A | 11/1997 |
| JP | 11-111243 A | 4/1999 |
| JP | 11-191401 * | 7/1999 |
| JP | 11-191401 A | 7/1999 |
| JP | 2002-155394 A | 5/2002 |
| JP | 2005-85479 A | 3/2005 |
| JP | 2005-149735 A | 6/2005 |

* cited by examiner

*Primary Examiner* — Raymond Alejandro
(74) *Attorney, Agent, or Firm* — Harness, Dickey & Pierce, PLC

(57) ABSTRACT

The plated steel plate for a cell can provides stable and good electrical contact on an outer surface of the cell can, and the evolution of gas within a battery can be suppressed by reducing damage to a plated surface of the steel plate when the cell can is formed by drawing press. In this manner, it is possible to provide a battery and an alkaline dry battery that can realize stable electrical contact with devices and reduce the evolution of gas. In a plated steel plate for a cell can both of whose surfaces are plated mainly with nickel, one surface of a steel plate that is a plated substrate is a dull finished surface, and another surface thereof is a bright finished surface.

5 Claims, 1 Drawing Sheet

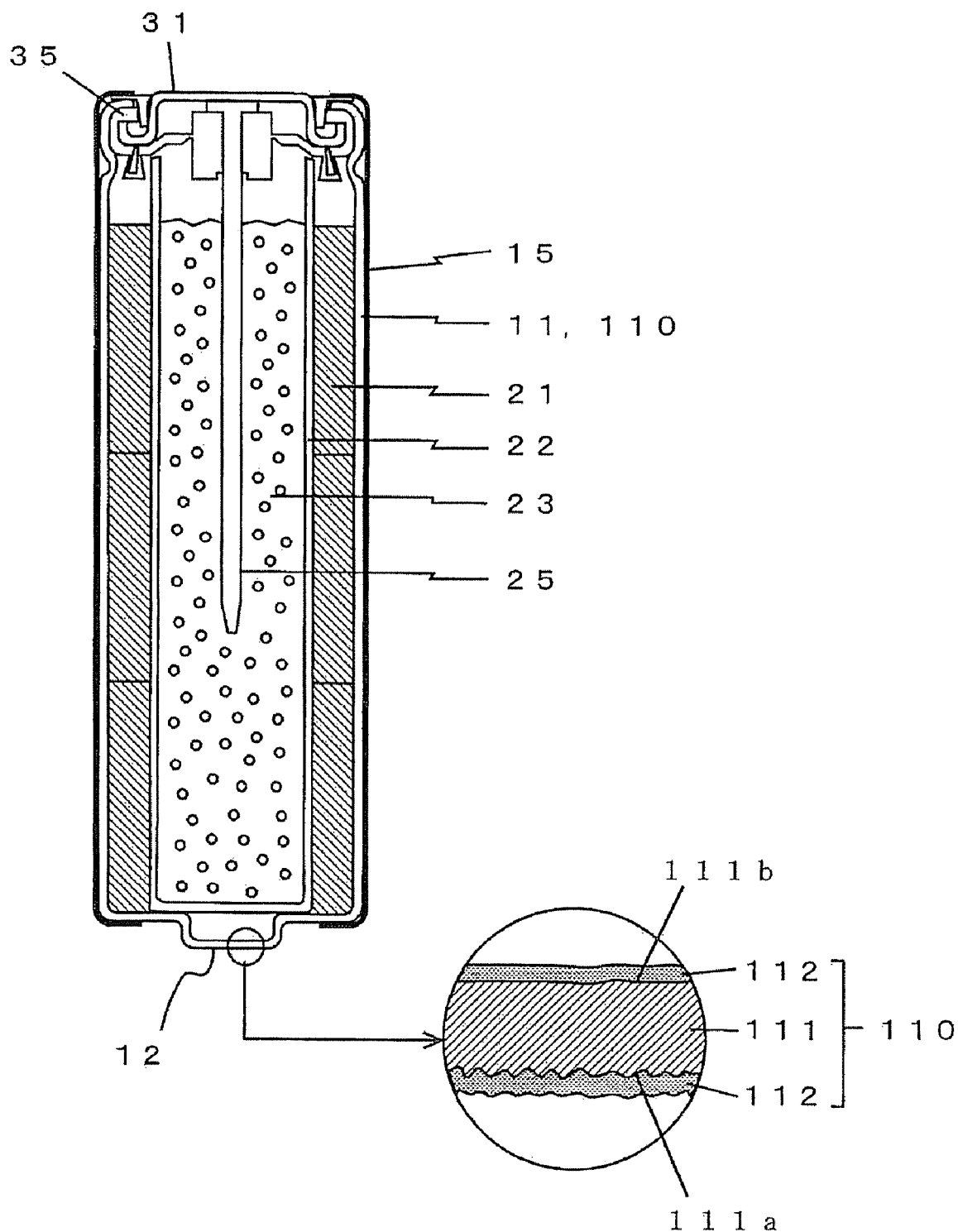

PLATED STEEL PLATE FOR CELL CAN, BATTERY, ALKALINE DRY BATTERY

TECHNICAL FIELD

The present invention relates to a plated steel plate for a cell can in which both surfaces thereof are plated mainly with nickel, and relates to a battery and an alkaline dry battery using this plated steel plate.

BACKGROUND ART

Cross-Reference to Related Applications

This application claims a priority to Japanese Patent Application No. 2006-151443, filed on May 31, 2006, which is incorporated herein by reference.

In recent years, battery-powered devices needing a large electric current such as digital still cameras have increased in number. Accordingly, high capacity alkaline dry batteries for a heavy load (discharging a large electric current) such as nickel dry batteries (ZR-type) are beginning to be provided.

The battery is usually loaded into a battery holder (battery case) provided in a device that is a load, and the battery supplies an actuating current to the device through contact terminals of the holder. For example, the electromotive force of dry batteries such as LR is at a low voltage of about 1.5V. In order to efficiently draw a large current out of the low-voltage battery, electrical connection between the battery and the load (device) needs to be kept good and stable over a long period of time.

For the battery such as an alkaline dry battery, a metal cell can is used to accommodate electricity generating elements in a hermetic sealing state, and this cell can also serves as a battery terminal of a positive electrode or a negative electrode. For example, in an LR alkaline dry battery, a cylindrical or annular cathode mixture is loaded into a bottomed cylindrical metal cell can in a press-fit condition, and a cylindrical separator and gelled negative electrode are loaded into the inner side of the mixture; thereby, electricity generating elements are formed. In this case, the cell can also serves as a positive terminal and a cathode current collector.

The above cell can is produced by processing a plated steel plate for a cell can by drawing press. The plated steel plate for the cell can includes a steel plate both of whose surfaces are plated mainly with nickel in order to reduce the occurrence of rust. On the other hand, from the viewpoint of reducing contact resistance, only plating is insufficient.

As means for surely reducing contact resistance, it has been proposed that the surface of the plated steel plate is made to be a rough surface, that is, the surface is dull finished (Japanese Patent Application Laid-open No. 2002-124218, for example). On the dull finished surface, fine bumps and depressions are formed; it can be considered that contact pressure is concentrated on the bumps of the bumps and depressions so that stable electrical contact can be surely obtained even at low voltage.

It has been found that the above-mentioned technique has following problems.

More specifically, on the cell can using the plated steel plate having a dull finished surface, increasing of the contact pressure on the bumps of the surface allows stable and good electrical contact to be formed between the cell can and devices. However, in the case where the cell can is prepared by drawing press, damage such as flaws and plating separation is likely to occur onto the surface. Therefore, an incompatible problem occurs that underlying iron is exposed on the inner surface of the cell can, and the evolution of gas is promoted within the battery.

Thus, the inventors have considered that one surface of the steel plate has a dull finished plating and another surface has a bright finished plating, and that the dull finished surface is provided as an outer surface of the cell can, and the bright finished surface is provided as an inner surface of the cell can. It has been found that this configuration is effective in overcoming the above incompatible problem. However, there are following difficulties to carry out the above invention.

That is, the process that plates a steel plate with a metal mainly based on nickel is performed by the electroplating in such a manner as the steel plate being a substrate is immersed in a plating bath. In such a plating process, it has been found that it is actually difficult to plate one surface of the steel plate and another surface thereof with different finishes respectively.

In Japanese Patent Application Laid-open No. 6-314563, processes are disclosed in which one surface of the steel plate plated with nickel is bright finished, and another surface thereof is dull finished respectively by using a rolling roller having a grid-finished roller and a smooth roller that are vertically disposed. However, the problem occurs that the plated surface of the plated steel plate processed mechanically in this manner becomes weak and the surface is further likely to be damaged by drawing press. At least in the plated steel plate for the cell can, it is desirable that the mechanical processing such as rolling and pressing should not be repeatedly performed.

DISCLOSURE OF INVENTION

The invention has been developed to overcome the technical problems described above, and an object thereof is to provide a plated steel plate for cell can, a battery and an alkaline dry battery using this plated steel plate, in which stable and good electrical contact can be provided on an outer surface of the cell can, damage to a plated surface of the steel plate can be reduced when the cell can is formed by drawing press, and thus the evolution of gas within the battery can be suppressed.

Objects and constitutions of the invention other than ones stated above will be apparent from the following detailed description and drawings attached herein.

According to the invention, there are provided following means.

(1) A plated steel plate for a cell can both of whose surfaces are plated mainly with nickel, including: a steel plate that is a substrate for plating, one of whose surfaces is dull finished, and another of whose surfaces is bright finished.

(2) A plated steel plate for a cell can according to the above means (1), wherein the average roughness (Ra: center line average roughness prescribed under JIS B060 1976, hereinafter the same shall apply) of a surface of a plating formed on the dull finished surface is set to 0.6 μm or more.

(3) A plated steel plate for a cell can according to the above means (1), the average roughness (Ra) of a surface of a plating formed on the bright finished surface is set to 0.4 μm or less.

(4) A plated steel plate for a cell can according to the above means (1), wherein at least the plating on the dull finished surface is a plating formed without adding a sulfur compound in a plating process.

(5) A plated steel plate for a cell can according to the above means (1), wherein a diffusion layer of nickel-iron is not included between the steel plate and a plated layer.

(6) A plated steel plate for a cell can according to the above means (1), wherein the thickness of the plating on the bright finished surface is set to 1.5 μm or more.

(7) A cell can, including: a plated steel plate according to the above means (1) that is formed by pressing into a bottomed cylindrical shape; an outer surface that is dull finished; and an inner surface that is bright finished.

(8) A battery, including: a cell can according to the above means (7) that accommodates an electricity generating element and is closed and sealed, and that also serves as an battery terminal of one electrode.

(9) An alkaline dry battery including: a bottomed cylindrical metal cell can that also serves as an battery terminal of one electrode, and that is a cell can according to the above means (7).

It is possible to provide a plated steel plate for a cell can in which stable and good electrical contact can be provided on an outer surface of the cell can, and the evolution of gas within a battery can be suppressed by reducing damage to a plated surface of the steel plate when the cell can is formed by drawing press. In this manner, it is possible to provide a battery and an alkaline dry battery that can realize stable electrical contact with devices and reduce the evolution of gas.

Features/advantages other than ones stated above will be apparent from the following detailed description and drawings attached herein.

BRIEF DESCRIPTION OF DRAWINGS

FIG. 1 is a cross-sectional view of an alkaline dry battery that is a preferred application example of the invention.

LIST OF REFERENCE NUMERALS 11 cell can, 110 nickel-plated steel plate for cell can,
111 steel plate (plated substrate), 111a dull finished surface,
111b bright finished surface, 112 plated layer,
12 positive terminal part, 15 cladding material,
21 cathode mixture, 22 separator,
23 gelled anode mixture, 25 anode electron collector,
31 negative terminal plate, 35 gasket

DETAILED DESCRIPTION OF THE INVENTION

FIG. 1 shows an embodiment of a battery to which technology of the present invention has been applied. The battery shown in the above view is an LR6 alkaline dry battery. Electricity generating elements including a solid cathode mixture 21, a cylindrical separator 22 permeated by an electrolytic solution, and a gelled anode mixture 23 are loaded into a bottomed cylindrical cell can 11, and the cell can 11 is closed and sealed with a negative terminal plate 31 and a gasket 35.

The cell can 11 also serves as a cathode current collector, and a convex positive terminal part 12 is formed by pressing on the underside of the cell can 11. A negative terminal plate 31 has an inner surface (inner side of the battery) to which an anode electron collector 25 in bar form is welded, and an outer surface whose center forms a negative terminal part. The cylinder side other than the terminal part 12 of the cell can 11 is covered with a cladding material 15.

A nickel-plated steel plate 110 for a cell can processed by drawing press is used for the cell can 11. The plated steel plate 110 used for manufacturing this cell can 11 is obtained by forming a metal-plated layer 112 on both surfaces of a thin steel plate 111 with mainly nickel as shown in its enlarge partial view of FIG. 1. In the invention, one surface of the steel plate 111 that is a substrate of the plated layer 112 is a dull finished surface 111a, and another surface thereof is a bright finished surface 111b.

When both surfaces of this steel plate 111 are electroplated with metal mainly such as nickel, the surface condition of the plated layer 112 reflects that of the substrate. The surface of the plated layer 112 provided on the dull finished surface 111a has a dull finished surface (coarse surface), and the surface of the plated layer 112 provided on the bright finished surface 111b has a bright finished surface (smooth surface). The above cell can 11 is formed so that its outer surface is the dull finished surface, and its inner surface is the bright finished surface.

The above cell can 11 has a dull finished outer surface that serves as a terminal face. Therefore, stable and good electrical contact can be surely obtained even with low voltage. On the other hand, the inner surface of the cell can is bright finished. Therefore, damage to the surface when undergoing the drawing press is reduced, and it is highly effective to suppress the evolution of gas due to the exposure of underlying iron.

In this case, it should be noted that, a major machine work that the plated steel plate 11 undergoes in a production process of the cell can 11 can be limited only to the process by drawing press. Although the plated surface of the steel plate is likely to be seriously damaged by repeatedly performing mechanical processing such as rolling and pressing, the damage can be kept to the minimum by limiting the mechanical processing only to the drawing press.

Thus, the exposure of the underlying iron on the inner surface of the cell can 11 can be suppressed. Additionally, it is possible to suppress, on the outer surface of the cell can, plating separation, rust caused by the exposure of the underlying iron, and the like. Accordingly, good electrical contact terminal face can be maintained on the outer surface of the cell can 11 over a long period of time.

Further, it has been found that following configurations are desirable in order to surely obtain the above effects.

That is, it is desirable that the average roughness (Ra) on the surface of the plated layer 12 formed on the dull finished surface 111a is set to 0.6 μm or more. It has been found that the effect of reducing contact resistance can not be sufficiently obtained when the average roughness (Ra) is less than 0.6 μm.

It is desirable that the average roughness (Ra) on the surface of the plated layer 12 formed on the bright finished surface 111b is set to 0.4 μm or less. It has been found that, when the average roughness is greater than 0.4 μm, the evolution of gas due to the exposure of the underlying iron increases, and thereby leak-proof property can not be sufficiently secured.

It is preferable that at least the plating of the dull finished surface 111a is formed without adding in the plating process a sulfur compound that is a brightener. There are cases in which a conversion coating (for example, oxide coating) which causes a contact resistance increase may be generated on the plated surface for a long period of time; it has been found that the above sulfur compound becomes a cause of generating the conversion coating.

It is desirable that there is no diffusion layer of nickel-iron between the steel plate 111 and the plated layer 112. The diffusion layer of nickel-iron is formed by annealing, and it has been found that annealing increases contact resistance.

It is desirable that the plating thickness of the bright finished surface is set to 1.5 μm or more. This is for surely preventing the exposure of the underlying iron, which becomes a cause of the evolution of gas within the battery.

According to the inventors' findings, it has been found that the plating thickness has to be 1.5 µm or more in order to surely suppress the evolution of gas.

EXAMPLE 1

As a sample battery for a test, a LR6 alkaline dry battery having a configuration shown in FIG. 1 was prepared. The configuration varies in accordance with following three different combinations.

(1) The cell can was prepared by processing a nickel-plated steel plate by a multi-step drawing press by a transfer. In the steel plate to be a substrate of the plated steel plate, a surface that is to be an inner surface of the cell can is bright finished with identical roughness (smoothness); on the other hand, its average roughness (Ra) of a surface that is to be an outer surface of the cell can varies from 0.4 µm to 3 µm step by step. The average roughness (Ra) of the plated surface is determined by the roughness of its substrate surface.

(2) The configurations varied depending on the existence or nonexistence of the annealing to the plated steel plate. In the steel plate that has been annealed, a diffusion layer of nickel-iron is formed between the steel plate and the plated layer. However, in the steel plate that has not been annealed, the diffusion layer is not formed.

(3) The configurations varied depending on whether a sulfur compound that is a brightener is used or not in the plating process.

When a contact resistance value (mΩ) was measured on the surface of the cell can in various kinds of sample batteries formed by any combination of the above configurations, and also its acceptability was judged, the following test results as shown in Table 1 were obtained. It should be noted that, the contact resistance value is a value measured at contact load of 30 gf after the sample battery has been stored at 60° C. of temperature and 90% of humidity for two weeks. Table 1 is shown below.

TABLE 1

Electrical Contact Resistance Value

| outer surface average roughness Ra (µm) | annealing | sulfur addition | contact resistance value (mΩ) | acceptability |
| --- | --- | --- | --- | --- |
| 0.4 | YES | YES | not measurable | NG |
| 0.4 | YES | NO | 864 | NG |
| 0.4 | NO | YES | 1011 | NG |
| 0.4 | NO | NO | 30.3 | NG |
| 0.5 | YES | YES | not measurable | NG |
| 0.5 | YES | NO | 1001 | NG |
| 0.5 | NO | YES | 755 | NG |
| 0.5 | NO | NO | 30.1 | NG |
| 0.6 | YES | YES | 1113 | NG |
| 0.6 | YES | NO | 150 | NG |
| 0.6 | NO | YES | 155 | NG |
| 0.6 | NO | NO | 11.1 | OK |
| 1 | YES | YES | 562 | NG |
| 1 | YES | NO | 91 | NG |
| 1 | NO | YES | 72 | NG |
| 1 | NO | NO | 10.1 | OK |
| 2 | YES | YES | 443 | NG |
| 2 | YES | NO | 80 | NG |
| 2 | NO | YES | 60.9 | NG |
| 2 | NO | NO | 7.8 | OK |

TABLE 1-continued

Electrical Contact Resistance Value

| outer surface average roughness Ra (µm) | annealing | sulfur addition | contact resistance value (mΩ) | acceptability |
| --- | --- | --- | --- | --- |
| 3 | YES | YES | 424 | NG |
| 3 | YES | NO | 85.3 | NG |
| 3 | NO | YES | 61.2 | NG |
| 3 | NO | NO | 7.8 | OK |

Table 1 shows that, in the case where the average roughness (Ra) of the plated surface formed on the surface that is to be an outer surface of the cell can is set to 0.6 µm or more, annealing is not performed, and furthermore, an sulfur compound is also not used, it is especially effective for reducing the contact resistance value.

EXAMPLE 2

Sample batteries for the test were prepared in such a manner as the average roughness (Ra) of the plated surface formed on the surface that was to be an inner surface of the cell can was different, respectively, and the incidence of fluid leakage of each sample was examined. In this case, each sample had an identical plating thickness of 1.5 µm. The incidence of fluid leakage was evaluated by counting the number of incidences in 20 sample batteries after the samples had been stored at 90° C. for 10 days.

Table 2 shows a condition of the incidence of the fluid leakage of each sample.

TABLE 2

Leak-Proof Property (plating thickness 1.5 µm)

| inner surface average roughness Ra (µm) | number of incidence of fluid leakage/ 20 samples | acceptability |
| --- | --- | --- |
| 0.2 | 0/20 | OK |
| 0.4 | 0/20 | OK |
| 0.5 | 3/20 | NG |
| 0.6 | 2/20 | NG |
| 1 | 2/20 | NG |
| 2 | 11/20 | NG |
| 3 | 18/20 | NG |

Table 2 shows that to set the average roughness (Ra) of the surface that is to be an inner surface of the cell can to 0.4 µm or less is effective for the leakage prevention. It is considered that this is because the surface is bright finished in such a manner as the average roughness (Ra) of the plated surface is set to 0.4 µm or less so that the exposure of the underlying iron hardly occurs and the evolution of gas is suppressed.

EXAMPLE 3

Sample batteries for the test were prepared in which the nickel-plated steel plates for each cell can had different plating thicknesses, and the incidence of fluid leakage of each sample was examined. In this case, the surface that is to be an inner surface of the cell can was made so that the average roughness (Ra) of the plated surface formed thereon is uniformly 0.4 µm. The incidence of fluid leakage was evaluated by counting the number of incidences in 20 sample batteries after the samples had been stored at 90° C. for 10 days.

The test result is shown in the following Table 3.

TABLE 3

Leak-Proof Property (Ra of inner surface: 0.4 μm)

| plating thickness (μm) | number of incidence of fluid leakage/ 20 samples | acceptability |
| --- | --- | --- |
| 0.5 | 11/20 | NG |
| 1 | 12/20 | NG |
| 1.5 | 0/20 | OK |
| 2 | 0/20 | OK |
| 2.5 | 0/20 | OK |

The table 3 shows that to set the plating thickness of the nickel-plated steel plate to 1.5 μm or more is especially effective for the leakage prevention. It is considered that this is because at least a certain amount of the plating thickness is secured so that the exposure of the underlying iron is less likely to occur and the evolution of gas is suppressed As stated above, although the invention has been explained based on its representative embodiments, various embodiments other than those stated above can be also realized in the invention. For example, the invention is also applicable to batteries other than the alkaline dry battery, such as nickel dry batteries (ZR-type) or lithium ion batteries.

Industrial Applicability

It is possible to provide a plated steel plate for a cell can in which stable and good electrical contact can be provided on an outer surface of the cell can, and the evolution of gas within a battery can be suppressed by reducing damage to a plated surface of the steel plate when the cell can is formed by drawing press. In this manner, it is possible to provide a battery and an alkaline dry battery that can realize stable electrical contact with devices and reduce the evolution of gas.

The invention claimed is:

1. A battery, comprising:
an electricity generating element; and
a cell can
that accommodates the electricity generating element and is closed and sealed, the cell can
also serving as a battery terminal of one electrode, the cell can including a steel plate serving as a substrate for plating, one of surfaces of the steel plate to be on an outer side of the cell can being dull finished, another surface of the steel plate to be on an inner side of the cell can being bright finished, the plated steel plating being plated with a plating mainly of nickel, the plated steel plate being pressed into a bottomed cylindrical shape in such a manner that the cell can has a dull finished surface on an outer side thereof and a bright finished surface on an inner side thereof, wherein a center line average roughness of a surface of the plating formed on the dull finished surface is set to 0.6 μm or more, wherein a center line average roughness of a surface of the plating formed on the bright finished surface is set to 0.4 μm or less, and wherein the thickness of the plating on the bright surface is set to 1.5 μm or more.

2. An alkaline dry battery comprising:
a bottomed cylindrical metal cell can
that also serves as a battery terminal of one electrode,
the cell can including a steel plate serving as a substrate for plating, one of surfaces of the steel plate to be on an outer side of the cell can being dull finished, another surface of the steel plate to be on an inner side of the cell can being bright finished, the plated steel plating being plated with a plating mainly of nickel, the plated steel plate being pressed into a bottomed cylindrical shape in such a manner that the cell can has a dull finished surface on an outside side thereof and a bright finished surface on an inner side thereof, wherein a center line average roughness of a surface of the plating formed on the dull finished surface is set to 0.6 μm or more, wherein a center line average roughness of a surface of the plating formed on the bright finished surface is set to 0.4 μm or less, and wherein the thickness of the plating on the bright surface is set to 1.5 μm or more.

3. A cell can, comprising:
a plated steel plate
including a steel plate serving as a substrate for plating, one of surfaces of the steel plate to be on an outer side of the cell can being dull finished, another surface of the steel plate to be on an inner side of the cell can being bright finished, the plated steel plating being plated with a plating mainly of nickel, the plated steel plate being pressed into a bottomed cylindrical shape in such a manner that the cell can has a dull finished surface on an outer side thereof and a bright finished surface on an inner side thereof, wherein a center line average roughness of a surface of the plating formed on the dull finished surface is set to 0.6 μm or more, wherein a center line average roughness of a surface of the plating formed on the bright finished surface is set to 0.4 μm or less, and wherein the thickness of the plating on the bright surface is set to 1.5 μm or more.

4. A cell can according to claim 3, wherein
at least the plating on the dull finished surface is a plating formed without adding a sulfur compound in a plating process.

5. A cell can according to claim 3, wherein
a diffusion layer of nickel-iron is not included between the steel plate and a plated layer.

* * * * *